United States Patent
Nichols, Sr.

(10) Patent No.: US 7,411,499 B2
(45) Date of Patent: Aug. 12, 2008

(54) HARD COVER PRODUCT WITH CONCEALED SECURITY DEVICE

(75) Inventor: Dale Hunt Nichols, Sr., Brentwood, TN (US)

(73) Assignee: Smartguard, LLC, Nashville, TN (US)

( * ) Notice: Subject to any disclaimer, the term of this patent is extended or adjusted under 35 U.S.C. 154(b) by 0 days.

(21) Appl. No.: 11/105,859

(22) Filed: Apr. 14, 2005

(65) Prior Publication Data

US 2005/0237202 A1  Oct. 27, 2005

Related U.S. Application Data

(60) Provisional application No. 60/562,586, filed on Apr. 14, 2004.

(51) Int. Cl.
*G08B 13/14* (2006.01)
(52) U.S. Cl. .............. 340/572.1; 340/572.8; 340/539.1; 340/541; 340/693.5; 340/693.9; 340/825.69
(58) Field of Classification Search .............. 340/572.1, 340/572.3, 572.4, 572.8, 539.1, 5.8, 825.69, 340/540, 541, 693.5, 693.9, 693.12, 825.49; 325/487; 235/487, 492
See application file for complete search history.

(56) References Cited

U.S. PATENT DOCUMENTS

| 3,938,831 | A |   | 2/1976  | Herman |
|-----------|---|---|---------|--------|
| 4,709,813 | A |   | 12/1987 | Wildt ......................... 206/312 |
| 4,784,264 | A | * | 11/1988 | Sykes .................... 206/387.13 |
| 4,881,061 | A |   | 11/1989 | Chambers |
| 4,966,020 | A |   | 10/1990 | Fotheringham et al. ....... 70/276 |
| 5,031,756 | A |   | 7/1991  | Buzzard et al. .............. 206/1.5 |
| 5,209,086 | A |   | 5/1993  | Brühwiler ................... 70/57.1 |
| 5,236,081 | A |   | 8/1993  | Fitzsimmons et al. ......... 206/44 |
| 5,260,690 | A |   | 11/1993 | Mann et al. |
| 5,276,435 | A |   | 1/1994  | Rossides ..................... 340/691 |
| 5,297,672 | A |   | 3/1994  | MacTavish .................. 206/1.5 |
| 5,331,313 | A |   | 7/1994  | Koning |

(Continued)

FOREIGN PATENT DOCUMENTS

WO    WO 9315294    5/1993

OTHER PUBLICATIONS

"*The Henderson Network*", web page article from http://www.cypak.com/index.php?a=pressroom&b=newscomdex021121;Aug. 18, 2004; www.cypak.com, Cypak AB, Funckens Gränd 1, Box 2332, 103 18 Stockholm, Sweden.

(Continued)

*Primary Examiner*—Hung T. Nguyen
(74) *Attorney, Agent, or Firm*—Baker Donelson Bearman Caldwell & Berkowitz PC (57) ABSTRACT

A hard cover product having an outer liner attached to a pair of sheet members disposed in spaced-apart relation to define a gap. One of the hard sheet members defines a receiving zone that receives a security tag. An inner liner attaches overlying the pair of hard sheet members and concealing the security tag within the receiving zone. The gap between the pair of sheet members defines a spine for the hard cover product, whereby the opposing hard sheets defining a front cover and back cover that move together foldably. Methods of making a hard cover product and of making an intermediate board for use in a hard cover product are disclosed.

3 Claims, 6 Drawing Sheets

U.S. PATENT DOCUMENTS

| | | | |
|---|---|---|---|
| 5,440,296 | A | 8/1995 | Nelson |
| 5,477,219 | A | 12/1995 | Zarembo et al. |
| 5,500,640 | A | 3/1996 | Zhou et al. |
| 5,598,728 | A | 2/1997 | Lax .............................. 70/276 |
| 5,620,271 | A * | 4/1997 | Bergh et al. .................... 402/79 |
| 5,656,998 | A | 8/1997 | Fujiuchi et al. ............. 340/571 |
| 5,680,782 | A | 10/1997 | Komatsu et al. ............. 70/54.1 |
| 5,718,332 | A | 2/1998 | Tachibana ................ 206/308.2 |
| 5,745,036 | A | 4/1998 | Clare |
| 5,749,735 | A | 5/1998 | Redford |
| 5,762,377 | A | 6/1998 | Chamberlain ................ 283/67 |
| 5,782,350 | A | 7/1998 | Weisburn et al. ......... 206/308.2 |
| 5,802,890 | A | 9/1998 | Espada-Velasco ........... 70/57.1 |
| 5,812,065 | A | 9/1998 | Schrott et al. .......... 340/825.54 |
| 5,823,341 | A * | 10/1998 | Nakasuji ................ 206/387.11 |
| 5,847,649 | A | 12/1998 | Collins et al. |
| 5,850,752 | A | 12/1998 | Lax .............................. 70/276 |
| 5,882,052 | A | 3/1999 | Whitehead ................... 292/80 |
| 5,909,176 | A * | 6/1999 | Schrott et al. ............ 340/572.1 |
| 5,910,770 | A * | 6/1999 | Ohara ..................... 340/572.5 |
| 5,984,388 | A | 11/1999 | Bacon ..................... 292/307 R |
| 5,988,376 | A | 11/1999 | Lax ......................... 206/308.2 |
| 6,082,156 | A | 7/2000 | Bin ............................ 70/57.1 |
| 6,094,137 | A | 7/2000 | Rasch et al. |
| 6,100,804 | A | 8/2000 | Brady et al. |
| 6,142,697 | A * | 11/2000 | Williams ..................... 402/31 |
| 6,155,087 | A | 12/2000 | Necchi ....................... 70/57.1 |
| 6,222,453 | B1 * | 4/2001 | Joyce ..................... 340/572.8 |
| 6,244,462 | B1 | 6/2001 | Ehrensvärd et al. ............ 221/7 |
| 6,276,523 | B2 | 8/2001 | Sanders |
| 6,374,648 | B1 | 4/2002 | Mitsuyama ................. 70/57.1 |
| 6,497,125 | B1 | 12/2002 | Necchi ....................... 70/57.1 |
| 6,601,415 | B2 | 8/2003 | Takinami .................... 70/57.1 |
| 6,614,750 | B2 | 9/2003 | Weber et al. ................. 369/290 |
| 6,616,035 | B2 | 9/2003 | Ehrensvärd et al. ......... 235/380 |
| 6,619,079 | B2 | 9/2003 | Cheung ....................... 70/57.1 |
| 6,628,199 | B1 | 9/2003 | Ehrensvärd et al. ...... 340/568.1 |
| 6,888,509 | B2 | 5/2005 | Atherton ..................... 343/718 |
| 6,937,153 | B2 | 8/2005 | Redlin ..................... 340/572.8 |
| 6,947,371 | B2 * | 9/2005 | Bigley ..................... 369/290.1 |
| 7,008,134 | B2 * | 3/2006 | Lane ........................... 402/73 |
| 2002/0134119 | A1 | 9/2002 | Derman ......................... 70/58 |
| 2002/0149479 | A1 | 10/2002 | Duschek et al. .......... 340/572.1 |
| 2002/0196126 | A1 | 12/2002 | Eisenberg |
| 2003/0019770 | A1 | 1/2003 | Hodes ..................... 206/308.2 |
| 2003/0094021 | A1 | 5/2003 | Takinami .................... 70/57.1 |
| 2003/0131638 | A1 | 7/2003 | Chang ........................ 70/57.1 |
| 2003/0145635 | A1 | 8/2003 | Sheslow ..................... 70/57.1 |
| 2003/0168514 | A1 * | 9/2003 | Rancien et al. |
| 2003/0234190 | A1 | 12/2003 | Kuo ........................ 206/308.2 |
| 2004/0008613 | A1 | 1/2004 | Beckwith et al. ............ 369/291 |
| 2005/0237202 | A1 * | 10/2005 | Nichols, Sr. |

OTHER PUBLICATIONS

"Roland Piquepaille's Technology Trends"; "*Cypak Mounts CPUs On Paper. Can Disposable PC's be far off?*", web page article from http://radio.weblogs.com/0105910/2003/02/03.html; Jan. 3, 2004.

RFID Journal "*The Package Is the Computer*"; web page article from http://www.rfidjournal.com/article/view/301; Feb. 11, 2003.

"*04 01 13 Cypak signs agreement to license proprietary intelligent pharmaceutical packaging technology to MeadWestvaco Healthcare Packaging;*" web page article from http://.cypak.com?test_site/index.php?a=pressroom7b=news&page=news_meadwestvaco04 . . . ; Jan. 13, 2004; www.cypak.com, Cypak, AB, Funkens Gränd 1, Box 2332, 103 18 Stockholm, Sweden.

MeadWestvaco, Healthcare Packaging, announcement, New York, NY Apr. 2, 2004, "*MeadWestvaco Healthcare Packaging enhance electronic compliance packaging offering using Cypak AB Products*".

Smart Healthcare USA 2004, "*RFID and Smart Packaging in healthcare*"; web page article from http://www.idtechex.com/smarthealthcareusa/4.asp; Jun. 10-11, 2004.

"*The Swedish Industrial Development Fund and IT Provider invest in Cypak*"; web page article from http://64233.179.104/search?p=cache:rKf2CZYzvloJ:cypak.vnewscenter.com/press. jsp%3Fid%3...; Aug. 18, 2004, www.cypak.com, Cypak AB, Funckens Gränd 1, Box 2332, 103 18 Stockholm, Sweden.

Conference Report: "Smarter Packaging", Packworld.com *Packaging World Magazine*; web page article from http://www.packworld.com/articles/ Features/18411html, Nov. 2004.

"*About SenTech*"; web page article from http://www.sentecheas.com/about.htm; www.cypak.com, Sen Tech EAS Corporation, 2843 Centerport Circle, Pompano Beach, FL 33064, at least as early as Apr. 2004.

"Intelligent Pharmaceutical Packaging"; "*Summary*" and IPP PowerPoint™ presentation from http://www.cypak.com/index. php?a=products&b=ipp&c=summary&page=products_ipp; www. cypak.com, Cypak AB, Funckens Gränd 1, Box 2332, 1103 18 Stockholm, Sweden, at least as early as Apr. 2004.

"Intelligent Pharmaceutical Packaging"; "*Articles*"; web page articale from http://www.cypak.com/index.php?a=pressroom&b=articles&page=pressroom_articles; www.cypak.com, Cypak AB, Funckens Gränd 1, Box 2332, 103 18 Stockholm, Sweden, at least as early as Apr. 2004.

"*The Connected Drug Box*"; web page article from http:..web. archive.org/web/20021209044120/cypak.com/index. php?a=pressroom&b=news&page...; www.cypak.com, Cypak AB, Funckens Gränd 1, Box 2332, 103 18 Stockholm, Sweden, at least as early as Apr. 2004.

"*Electronic Compliance Packaging*"; web page article from http://web.archive.org'web/20030409195629/www.cypak.com/index. php?a=products&b=packaging&page=products_packaging; www. cypak.com, Cypak AB, Funckens Gränd 1, Box 2332, 103 18 Stockholm, Sweden, at least as early as Apr. 2004.

"*We are innovators. . . .*"; web page article from http://web.archive. org/web/20031206192144/http://cypak.com; www.cypak.com, Cypak AB, Funckens Gränd 1, Box 2332, 103 18 Stockholm, Sweden, at least as early as Apr. 2004.

KR 535 Tabmaster Product Flyer, "*The KR 535 makes tabbing of paper products faster and easier than ever. Here's why. . . .*", Kirk Rudy, Inc., 2700 Kennesaw Due West Road, Kennesaw, GA., USA 30144, at least as early as Apr. 2004.

KR 203P Attaching System Product Flyer, "*The KR 203P attaches a wide variety of cards and pre-packaged samples onto various mailers and inserts*", Kirk Rudy, Inc., 2700 Kennesaw Due West Road, Kennesaw, GA., USA 30144, at least as early as Apr. 2004.

The Endpaper, "REFID Tags and the ALA", p. 9, Library Binding Institute, 14 Bay Tree Lane, Tequesta, FL 33469 (May 2005).

MSN search "acousticmagnetic" listing Sentech Acousto-Magnetic (AM) Tags, www.sentecheas.com (search conducted Aug. 12, 2004).

Sentech EAS Corporation, www.sentecheas.com, Product Listing (2p), RF Technology (1p), and About Sentech (1 p), (prior to Apr. 14, 2004).

International Search Report, PCT/US05/13105 (Jan. 31, 2007).

* cited by examiner

HARD COVER PRODUCT WITH CONCEALED SECURITY DEVICE

The present application claims priority to provisional patent application Ser. No. 60/562,586, filed Apr. 14, 2004, and incorporates same herein by reference.

TECHNICAL FIELD

The present invention relates to hard cover products. More particularly, the present invention relates to hard cover products with concealed security devices for facilitating manufacture and use of hard cover products.

BACKGROUND OF THE INVENTION

In recent years, tracking of inventory of goods has become of increased importance. Inventory of goods represents a significant investment in capital. In addition to cost factors, other aspects prompting increased interest in tracking inventory include the increase in just-in-time manufacturing in which materials are provided by suppliers shortly prior to the time of use by the manufacturer of goods, as well as theft deterrence and inventory verification and auditing.

Various electronic and mechanical devices have been provided for tracking and monitoring of goods and containers. These devices include acoustic magnetic security strips and radio frequency security tags. These devices often are embodied in tags, pods, labels, or patches, having adhesive surfaces for attaching the device to the goods or their containers. These devices facilitate tracking and monitoring of goods and containers. The security devices are typically attached to the articles particularly susceptible to pilferage and improper removal from a warehouse or retail store. The security devices include a detectable sensor. One known type of security tag has a circuit that resonates at a predetermined detection frequency range. A transmitter provides electromagnetic energy that excites the circuit. A receiver detects the output signal from the resonating circuit. The transmitter and the receiver are located at detection points, often exits from retail facilities. As the article is carried through the detection point, the receiver signals an alert when an activated sensor device is detected. For articles that are permitted to pass (such as purchased articles), a separate device is used to deactivate the detectable sensor prior to passage. Other devices include RFID devices that communicate digital signals. In some known RFID devices, the signal is indicative of unique identifiers for tracking particular containers.

Often large retailers require manufacturers of articles to include tracking and monitoring devices within the containers for the articles. For smaller retailers and smaller inventories of articles, the tracking and monitoring devices may not be included with or attached to containers. In such circumstances, the articles may be provided with after-market tracking and monitoring devices. For example, electronic article surveillance tags are available with adhesive backing to secure the tags to the containers. While the containers are thereby subject to electronic article surveillance, the adhesively attached tags experience problems during use. One significant problem is that the tags, being on the exterior of the container, are susceptible to removal. Removing the security tag facilitates circumventing security and the unauthorized removal of the article from the secured area. However, removal by a purchaser also causes problems. The covering to which the security tag attaches may become torn or ripped, thus damaging the package.

Further, the package with the security tag, or without such by removal, creates an eyesore visible to the consumer. The security tag may also overlie or cover over ornamental graphics or text on the packaging. The security device thereby interferes with the printed graphics and/or with other types of covering material and distracts or covers up the printing/stamping designed to enhance the marketability of a product.

Also, importantly, the attachment of an electronic security tag to an interim assembly of an article during manufacture lead to production and handling problems. These manufacturing problems include mechanical problems when producing a product, and also having to operate manufacturing equipment at reduced production speeds. The security tag projects from the surface to which it attaches. This causes stacked ones of the interim assemblies to gradually angle or tip as the stack height increases with placement of additional interim assemblies. For example, hard cover books assembled using casing machines receive an outer liner that attaches to front cover stock and back cover stock. Such interim assemblies are stacked for a second pass through the casing machine to apply an inner liner. Angled stacks make production and handling more difficult during manufacturing. Further, the protruding security tag may scratch the adjacent assembly, for example, when a feeder device pushes one of the assemblies from a hopper for processing and applying the inner liner.

Accordingly there is a need in the art for providing hard cover products with concealed security tracking and monitoring devices. It is to such that the present invention is directed.

SUMMARY OF THE INVENTION

The present invention meets the need in the art by providing a hard cover product having an outer liner attached on a major surface to a pair of sheet members. The sheet members are disposed in spaced-apart relation and define a front cover and a back cover for the hard cover product. One of the hard sheet members defines a receiving zone that receives a security tag. An inner liner overlies the pair of sheet members and conceals the security tag within the receiving zone. A gap between the pair of sheet members defines a spine for the hard cover product, with the opposing front cover and back covers moving together foldably.

In another aspect, the present invention provides a method of making a hard cover product, comprising the steps of:

(a) forming a recess in a first sheet;

(b) attaching an outer liner to a major surface of the first sheet and to a second sheet spaced apart therefrom to define a gap therebetween, the first sheet and the second sheet defining a front and back cover;

(c) depositing a security tag within the recess;

(d) attaching an inner liner in overlying relation to the first and second sheets, the gap defining a spine on which the opposing front and back covers pivot towards each other.

Objects, advantages and features of the present invention will become apparent from reading of the following detailed description of the invention and claims in view of the appended drawings.

DETAILED DESCRIPTION

Figure 1:
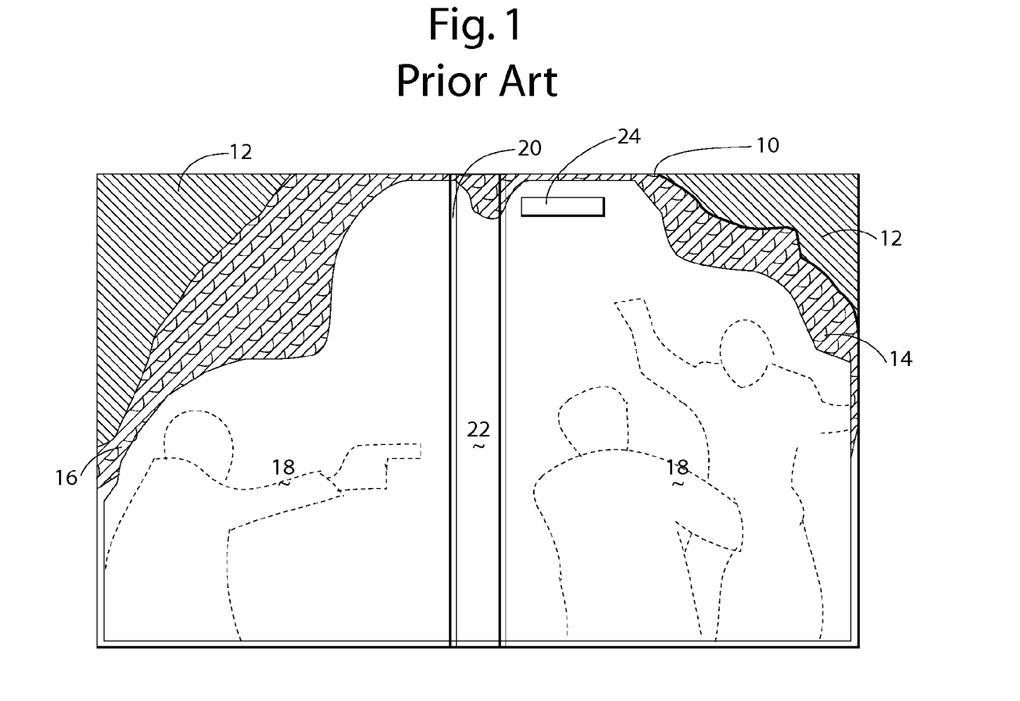
FIG. 1 is a plan view of a hard cover product in which a security device is attached to an exterior surface.
Figure 2:
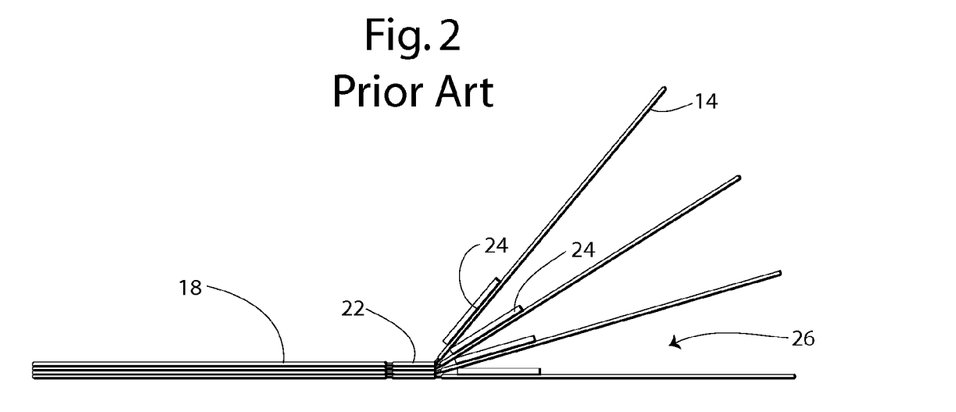
FIG. 2 is an end view of a stack of assemblies used to make a hard cover product illustrated in FIG. 1.

Referring now in more detail to the drawings in which like numerals refer to like parts throughout the several views, FIG. 1 illustrates a hard cover product 10 having an outer liner 12, a pair of spaced-apart sheets 14, 16, and covered by an inner liner 18. The outer liner 12 and the inner line 18 may include graphics, text, and other visual ornamentation, such as the graphics 17. The sheets 14, 16 (enclosed by the outer liner 12 and the inner liner 18) define front and back covers for the product. A pair of spaced-apart grooves or scores 20 enable the sheets 14, 16 to fold together to close the hard cover product 10. A gap 22 between the scores 20 defines a spine or back of the closeable hard cover product 10. A security sensor 24 attaches with adhesive to the face of the inner liner 18 in a selected position. The sensor extends above the surface defined by the inner liner 18. As illustrated in FIG. 2, this can lead to handling and production problems during manufacture of the hard cover product 10. The upwardly extending security sensor causes a portion of the stack to be disposed an oblique angle 26, rather than lying flat. This uneven stack makes handling of work in progress more difficult.

Figure 3:
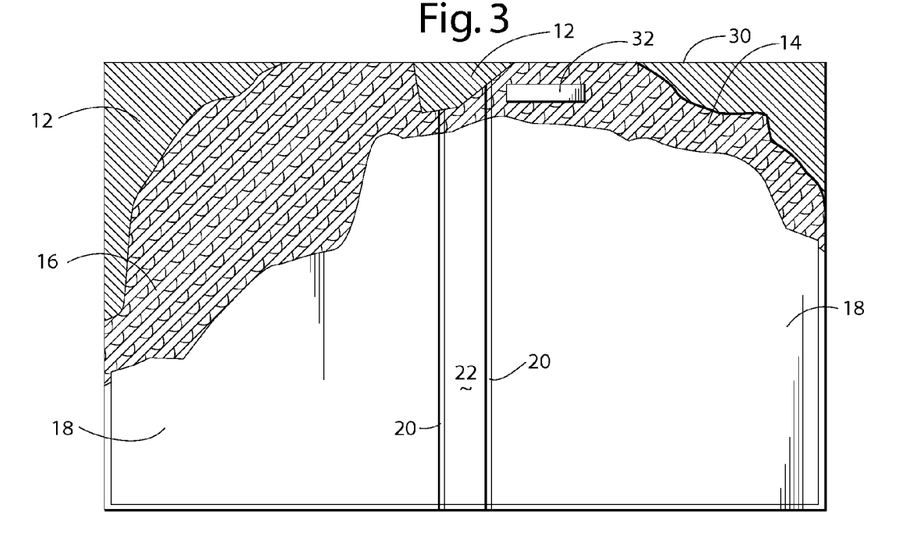
FIG. 3 is a plan view of an embodiment of the present invention providing a hard cover product with a concealed security device.
Figure 4:
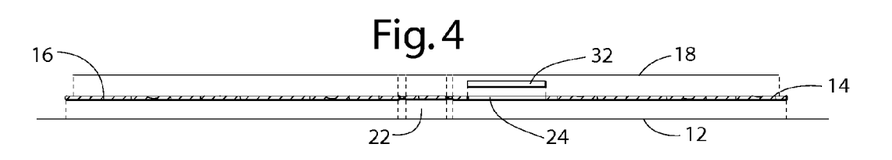
FIG. 4 is an exploded edge view of the hard cover product assembly illustrated in FIG. 3.

FIG. 3 illustrates a hard cover product 30 according to the present invention in which the security sensor 24 is concealed within an assembly of the outer liner 12, the sheets 14, 16, and the inner liner 18. FIG. 4 is an exploded edge view of the hard cover product assembly illustrated in FIG. 3. A recess 32 is formed in the sheet 14 such as by die cutting the sheet in a casing operation typical for binding of books using a casing machine. An applicator apparatus places the security sensor 24 within the recess 32. The outer liner 12 closes the recess 32 from an exterior side of the assembly for the hard cover product 30, and the inner liner 18 closes the recess 32 from the opposing interior side. The inner liner 18 thereby conceals the security device 24 within the hard cover product 30.

The thickness of the sheet 14 (on a line 34 shown in FIG. 4 transverse through the opposing major surfaces) is preferably sufficient that the security device 24 is recessed in the recess 32 relative to the major surfaces. The sheets 14, 16 are cardboard sheet, fiberboard sheets, or other stiff or hard sheet material suitable for forming a cover to a book, casing, or other article-container.

In the illustrated embodiment, the gap 22 defines scores or grooves in the overlapped inner and outer lines 12, 18. These define pivots or lines on which the front and back covers fold together.

Figure 5:
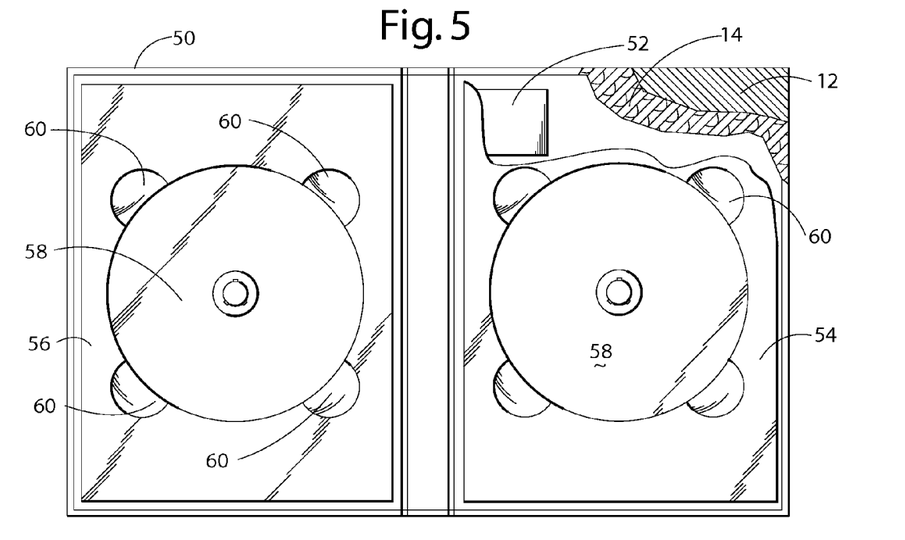
FIG. 5 is a plan view of an alternate embodiment of the hard cover product according to the present invention.

FIG. 5 illustrates an alternate embodiment of a hard cover product 50 according to the present invention. In this embodiment, a substantially planner radio frequency tag 52 attaches to the surface of the sheet 14a. The inner liner 18 attaches in overlaying relation to the sheets 14, 16. In the illustrated embodiment, which does not include the recess 32, the inner liner 18 extends over the area of the spine. The inner liner 18 thereby overlies and concealingly encloses the sheet-like security tag 52. The security tag 52 is perceptible as a slight bulge, but generally does not detract from the graphics or text on the inner liner.

Figures 8A, 8B:
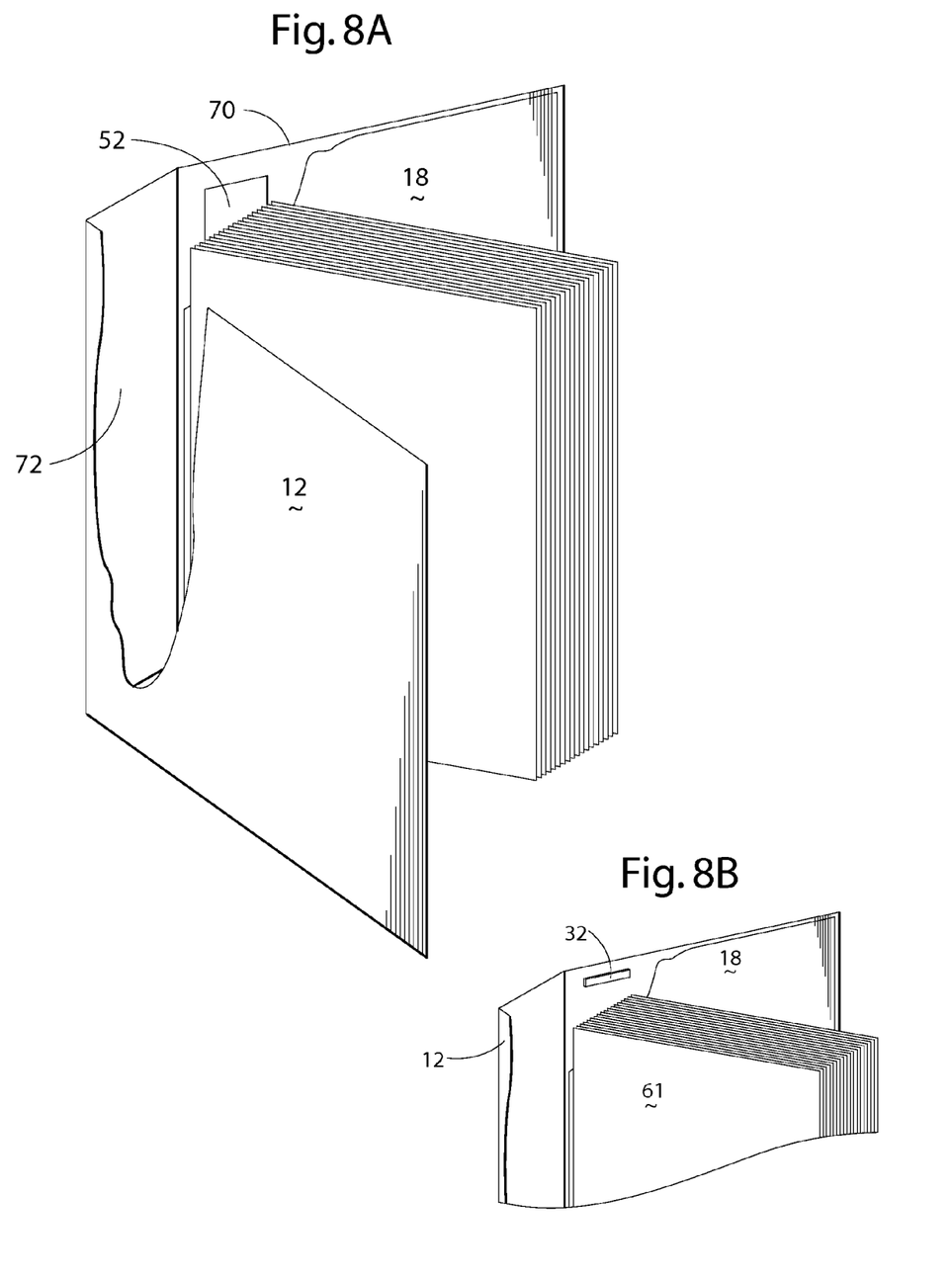
FIGS. 8A and 8B are perspective view of a hard cover product with a bound assembly of papers for a book.

In the illustrated embodiment, the hard cover product 50 attaches to an interior body, such as plastic matingly engagable plastic diskholders, configured for receiving compact discs or DVD discs. However, the interior body may be a bound assembly of papers for a book. Other shell devices that define an interior body for the hard cover product may be gainfully attached to the interior front and back covers, such as for packaging small articles, video tapes, books, ring binders, or other articles. For example, FIGS. 8A and 8B illustrate a bound assembly 61 of paper sheets containing printed material to be bound in the hard cover product as a book with a security device 24 or 52. The bound assembly 61 attaches to the spine 22.

Figures 6, 7:
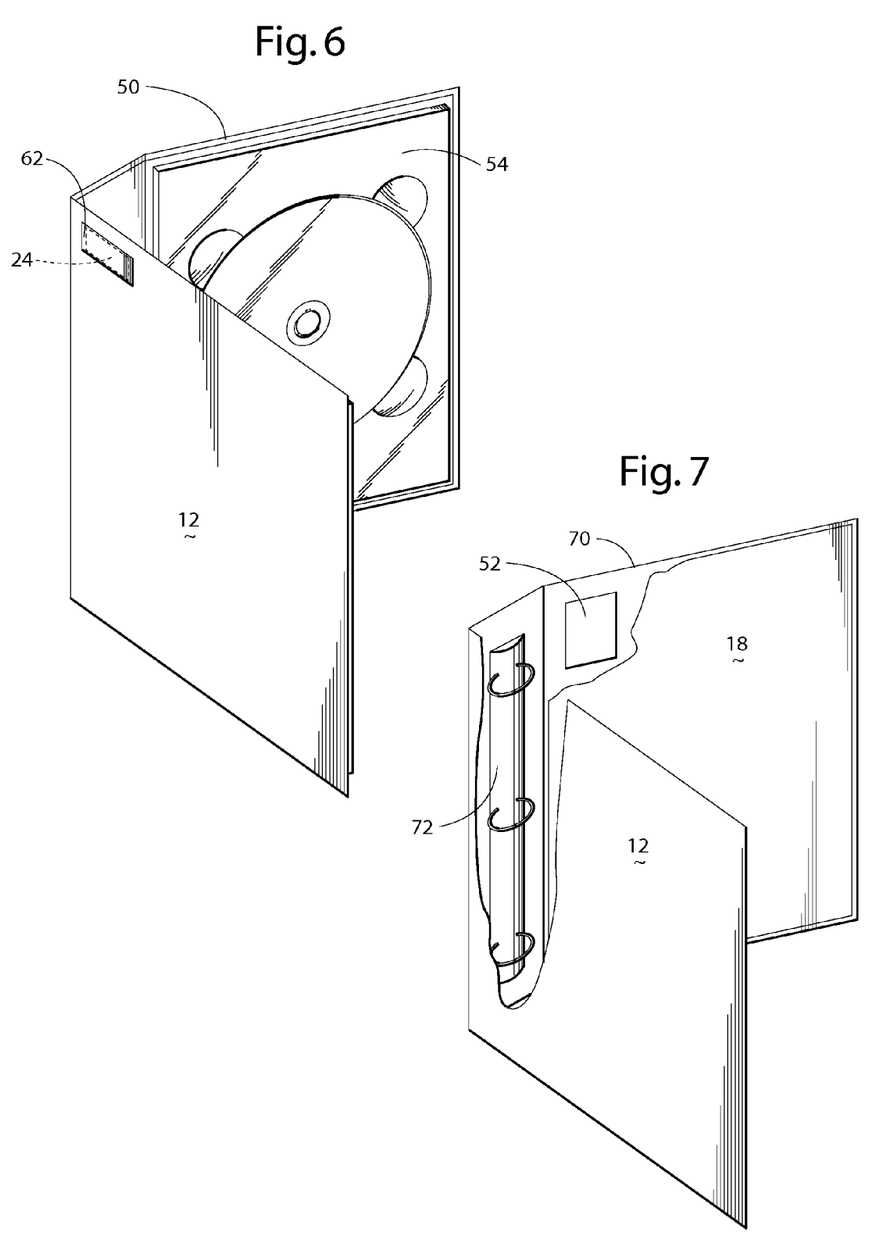
FIG. 6 is a perspective view of a hard cover product illustrating features of the present invention.
FIG. 7 is a perspective view of an alternate embodiment of the hard cover product according to the present invention.

FIG. 6 illustrates the hard cover product 50 in which the outer liner 12 includes an indicia 62 such as a bar code or other product inventory number. In this embodiment, the recess 32 for the security tag 24 (or security tag 52 attached to the sheet 14) is disposed substantially in alignment with the indicia 62. In this way, a security tag detector deactivates the security tag when the hard cover product 30 is scanned for pricing, so that the product can be taken from a store without triggering alarms.

FIG. 7 illustrates an alternate embodiment of a hard cover product 70 that includes a three-ring binder assembly 72. In this embodiment, the sheet 14 receives one of the sheet-like security devices 52, although in an alternate embodiment, the sheet defining front (or back) cover includes the recess 32.

Figure 9:
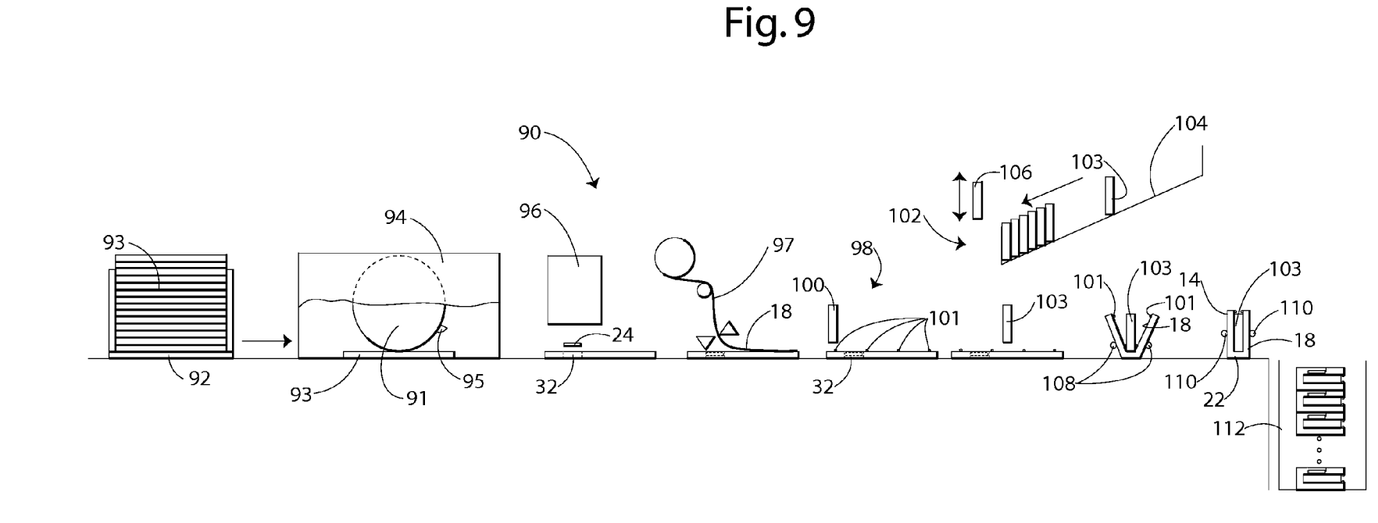
FIG. 9 is a schematic illustration of an assembly line for manufacturing hard cover products of the present invention.

FIG. 9 is a schematic illustration of an assembly line 90 for manufacturing hard cover products of the present invention discussed above. The assembly line 90 includes a supply hopper 92 that receives a stack 93 of interim assemblies of the hard cover product. A casing machine 94 operates to cut blanks of cardboard sheets to define the front and back cover bodies enclosed in the outer and inner liners. The casing machine 94 (such as a KOLBUS 232 case machine or similar equipment) also includes a rotatatable cylinder 91 with a die cutter 95 for slitting open the recess 32. An interim assembly of the hard cover product includes the outer liner 12 attached to the sheets 14, 16. A label applicator 96 (such as a LABELAIRE or similar device) receives a supply of security tags 24 and positions one in the recess 32 or on the sheet 14 (for a sheet type security tag). Operation of the assembly line in a first stage of manufacture results in interim assemblies that are subsequently returned to the hopper for attaching the inner liner 18.

The assembly line 90 further includes an inner liner application station 97 in which the inner liner 18 is attached in overlying relation to the major surfaces of the sheets 14, 16 opposing the outer liner 12. A glue station 98 includes an adhesive applicator 100 for depositing a selected adhesive 101 to the inner liner 18. A casing applicator 102 includes a supply hopper 104 that holds a plurality of interior bodies or casings 103, such as the engageable shells 54, 56. A metering device 106 causes one of the casings 103 to be positioned on the spine 22. Opposing ploughs 108 guide the opposing front and back covers to pivot together to foldingly close the hard cover product. Rollers 110 bear against the opposing covers to close the hard cover product and to force the casing 103 into engaging contact with the adhesive. The completed, closed hard cover product then is received in a stacker 112 for packaging.

Accordingly, the manufacturing process in one embodiment comprises the steps of: (a) die cutting an aperture in a board of the turned edge or paper-lined product prior to wrapping the product or mounting a paper product to it; (b) mounting or attaching the printed cover material to a surface of the board; (c) placing a security sensor bar in the die cut aperture; (d) lining the exposed side of the board with an inner liner of a sheet material that may or may not be printed. This process places the security bar or device within the die cut aperture or cavity to eliminates covering up of the printing or printed matter on the cover or inner liner, reduces mechanical problems related to manufacturing with resultant cost savings, increases the difficulty for a person to remove the security tag without damaging the package or product itself, and allows placing the security bar at any position within the board of the hard cover product.

As to RFID security stickers, the present invention provides a method and apparatus to fully conceal an RFID security sticker by applying the sheet-like RFID sticker to a selected position on a board used for a hard cover product either prior to case making the cover or after case making and prior to lining the cover product with a printed cover stock, and thereby concealing the RFID sticker so it has reduced visibility in the competed product. The RFID security device is placed in the product to have reduced visibility to a casual eye while eliminating the covering up of the printed or decorated product. Manufacturing problems are reduced with resultant cost savings. The concealed security device is difficult to remove without severely damaging the product or package itself.

Figure 10:
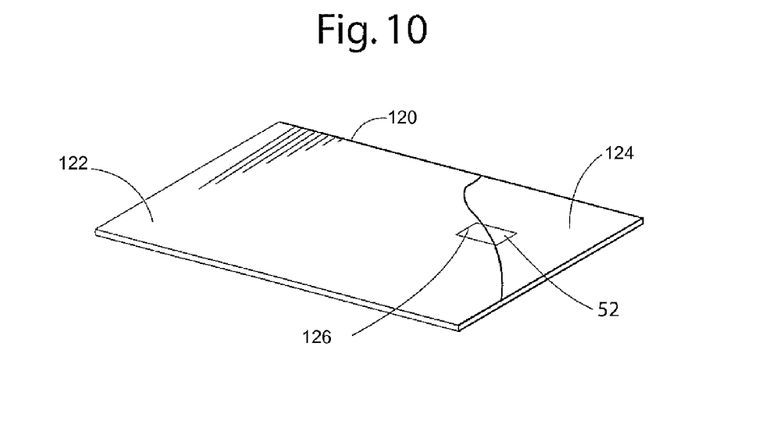
FIG. 10 is a perspective cut-away view of a laminated multi-ply board having a security device sandwiched within the board and an index as to the location of the security device in accordance with the present invention.

FIG. 10 illustrates in perspective cut-away view a laminated multi-ply board 120 having at least two layers 122, 124 of a board stock material and sandwiching within the laminated board a security device 52 and including an aligned index mark 126 as to the location of the security device 52 in accordance with the present invention. While the board 120 may include the security device 24, the laminated multi-ply board preferably uses the sheet-like security device 52. The board 120 provides an intermediate product useful in assembly of hard cover products such as those discussed above. The board 120 includes the index mark 126 on the exterior surface of the layer 122 for alignment of the intermediate product in casing machines and other equipment during the subsequent book casing manufacture process, such as for proper orientation of the board 120 to align with the indicia 62 of the outer cover sheet 12. In one embodiment, the board layers 122, 124 are 40 point chip boards that are pasted together with an adhesive to form a substantially 80 point board commonly used in book casing operations.

Figure 11:
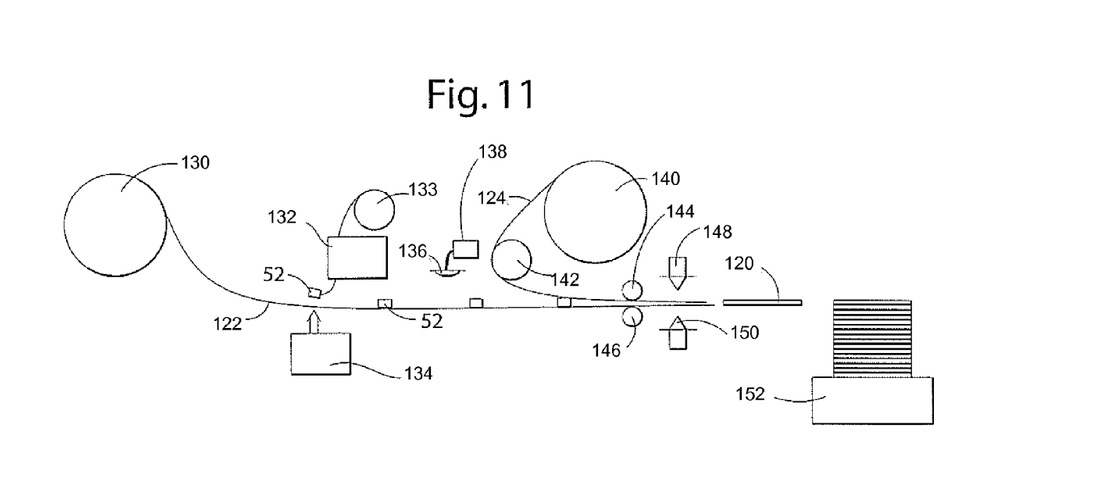
FIG. 11 is a schematic illustration of a manufacturing process to make the laminated multi-ply board illustrated in FIG. 10.

FIG. 11 is a schematic illustration of a manufacturing process to make the laminated multi-ply board 120 illustrated in FIG. 10. A supply roll 130 provides a continuous feed of the first layer 122. An applicator 132 applies the security device 52 from a supply 133 to a surface of the layer 122 while a marker 134 applies the index mark 126 simultaneously to an opposing side of the layer 122. The security device is illustrated in exaggerated size for illustration purposes. The marker 134 moves from a retracted position to a marking position in sequence with the applicator 132 placing the security device. A adhesive sprayer 136 communicates with a supply 138 and applies a spray of an adhesive to the surface of the layer 122. A second supply roll 140 provides a continuous feed of the second layer 124 past appropriate guide rolls 142. Crimp rollers 144, 146 compress the first and second layers 122, 124 together sandwiching the security device. A knife 148 periodically moves against an anvil 150 to separate discrete laminated boards 120 from the continuous feed. A stacker 152 collects the separated boards 120 for packaging or transfer to a casing line.

This specification has described the present invention that provides a hard cover product with a concealed security device, including the steps necessary for making and using various embodiments thereof. It is to be understood, however, that numerous changes and variations may be made in the construction of the present hard cover product within the spirit and scope of the present invention, and that modifications and changes may be made therein without departing from the scope thereof as set forth in the appended claims.

What is claimed is:

1. A hard cover disk container for secured storage and handling of audio or video disk products provided to sales outlets by a disk manufacturer, comprising:

an outer liner having an exterior surface that includes graphics images and a coded indicia bar code;

a pair of opposing hard sheet members disposed in spaced-apart relation to define a gap and attached to an inner surface of the outer liner, opposing side edges of the respective hard sheet members and the outer liner defining foldable hinging portions thereof;

one of the hard sheet members defining a open slot in substantial alignment with the coded indicia bar code on the exterior surface of the outer liner;

a security tag received within the slot, the slot of a depth such that the security tag is no more than substantially co-planar relative to a major surface of the one of the hard sheet members receiving the security tag;

an inner liner overlying the pair of hard sheet members and concealing the security tag within the slot, the hard sheet members covered by the outer liner and the inner liner define respective front and back covers of a hard cover product, selectively movable on the foldable hinging portions by pivoting the front cover and back cover together to a closed position and pivoting apart to an open position;

opposing shells received on the inner liner overlying the respective hard sheet members and selectively matingly enagable upon pivoting the front cover and the back cover together on the foldable hinging portions so as to align the opposing shells together and selectively releasable upon moving the front cover and the back cover apart, at least one of the shells configured for receiving a disc for storage thereon;

an audio/video disk removably attached to said one of the shells for storage within the mating shells upon pivoting the front cover and the back cover together; and the gap between the pair of hard sheet members defining a spine for the hard cover product.

2. The hard cover product as recited in claim 1, wherein the security tag is a sheet-like electronic response device.

3. The hard cover product as recited in claim 1, wherein a perimeter portion of the outer liner overlaps and attaches to laterally outward edge portions the pair of sheet members.

* * * * *

UNITED STATES PATENT AND TRADEMARK OFFICE
CERTIFICATE OF CORRECTION

PATENT NO. : 7,411,499 B2 Page 1 of 1
APPLICATION NO. : 11/105859
DATED : August 12, 2008
INVENTOR(S) : Dale Hunt Nichols, Sr.

It is certified that error appears in the above-identified patent and that said Letters Patent is hereby corrected as shown below:

In column 6, line 62, please change "sheet-like" to --sheet--.

Signed and Sealed this

Seventeenth Day of February, 2009

JOHN DOLL
*Acting Director of the United States Patent and Trademark Office*